United States Patent
Lavasserie et al.

(10) Patent No.: US 7,052,632 B2
(45) Date of Patent: May 30, 2006

(54) MAKING A NEEDLED FIBER PREFORM FOR FABRICATING A COMPOSITE MATERIAL PART

(75) Inventors: Eric Lavasserie, Begles (FR); Jean-Michel Guirman, Begles (FR); Eric Bouillon, Talence (FR); Eric Philippe, Victoria (FR)

(73) Assignee: SNECMA Propulsion Solide, Le Haillan Cedex (FR)

( * ) Notice: Subject to any disclaimer, the term of this patent is extended or adjusted under 35 U.S.C. 154(b) by 251 days.

(21) Appl. No.: 10/316,125

(22) Filed: Dec. 10, 2002

(65) Prior Publication Data

US 2003/0136502 A1 Jul. 24, 2003

(30) Foreign Application Priority Data

Dec. 11, 2001 (FR) .............................. 01 15961

(51) Int. Cl.
*B29C 65/62* (2006.01)
*B32B 5/16* (2006.01)

(52) U.S. Cl. ...................... 264/29.1; 264/131; 264/255; 264/257; 264/258; 156/89.25; 156/89.26; 156/93

(58) Field of Classification Search ................ 264/29.1, 264/29.5, 29.6, 29.7, 131, 255, 257, 258; 156/89.25, 89.26, 91–93
See application file for complete search history.

(56) References Cited

U.S. PATENT DOCUMENTS

| 4,515,847 | A |   | 5/1985  | Taverna et al. ............. 428/107 |
|-----------|---|---|---------|-------------------------------------|
| 4,790,052 | A |   | 12/1988 | Olry                                |
| 4,957,809 | A | * | 9/1990  | Davis ......................... 428/283 |
| 4,983,451 | A | * | 1/1991  | Sugino et al. .............. 422/283 |
| 5,080,851 | A | * | 1/1992  | Flonc et al. ................ 264/258 |
| 5,439,627 | A | * | 8/1995  | De Jager ..................... 264/129 |
| 5,475,904 | A |   | 12/1995 | Le Roy ....................... 28/108 |
| 5,766,534 | A | * | 6/1998  | White et al. ................. 264/258 |
| 6,221,475 | B1 | * | 4/2001 | Domergue et al. ........ 428/292.1 |
| 6,447,705 | B1 | * | 9/2002 | Fowler et al. .............. 264/255 |

FOREIGN PATENT DOCUMENTS

| FR | 2 619 104    | 2/1989  |
| GB | 1 310 355    | 3/1973  |
| GB | 2 125 459    | 3/1984  |
| JP | 62-198446    | 9/1987  |
| JP | 62-223356    | 10/1987 |
| JP | 8-309899     | 11/1996 |
| WO | WO 91/18741  | 12/1991 |
| WO | WO 97/04946  | 2/1997  |

* cited by examiner

*Primary Examiner*—Stefan Staicovici
(74) *Attorney, Agent, or Firm*—Weingarten, Schurgin, Gagbebin & Lebovici LLP

(57) ABSTRACT

A fiber preform constituting fiber reinforcement of a composite material part that is to be fabricated is made by superposing and bonding together fiber plies, and by densifying the needled preform by introducing a material constituting the matrix of the composite material into it. During the process of making the preform, a powder is dusted onto the surface of at least some of the plies, the powder comprising at least one ingredient selected from a solid resin in powder form and solid fillers in powder form. The powder is dusted onto the surface of the top ply of the preform that is being made, prior to superposing and needling at least one additional ply.

11 Claims, 3 Drawing Sheets

FIG.4 — Fiber bundles transferred by needling
FIG.6 — Filled resin coke; Fibers; Pyrolytic carbon matrix

MAKING A NEEDLED FIBER PREFORM FOR FABRICATING A COMPOSITE MATERIAL PART

BACKGROUND OF THE INVENTION

The invention relates to fabricating composite material parts comprising fiber reinforcement densified by a matrix.

The field of application of the invention is more particularly but not exclusively that of thermostructural composite materials which are characterized by their very good mechanical properties and by their ability to retain those properties at high temperatures. Such materials are carbon/carbon (C/C) composite materials or ceramic matrix composite (CMC) materials. They are used in particular in the field of aviation, space, and friction, in particular for the brake disks of airplanes or land vehicles.

Fabricating such a part out of composite material usually comprises making a fiber structure or "preform" that is to constitute the fiber reinforcement of the part, and then densifying the preform with a matrix.

Densification can be performed by a liquid technique, by a gas technique, or by combination of both techniques.

Densification using a liquid consists in impregnating the preform with a liquid composition that usually comprises a resin that is a precursor of the matrix material, with the resin being transformed (after cross-linking) by heat treatment.

Densification using a gas consists in performing chemical vapor infiltration (CVI). The preform is placed in an enclosure into which a gas is admitted, and under determined conditions of temperature and pressure the gas diffuses into the pores of the preform to form a solid matrix deposit therein, by means of one of the components of the gas decomposing or by means of a reaction between a plurality of components of the gas.

The processes for forming a carbon matrix or a ceramic matrix by the liquid technique and by the gas technique are well known.

Prior to densification, the preform may be consolidated. Consolidation consists in performing a stage of partial densification which is sufficient to give the preform strength or stiffness enabling it to be handled without deforming and enabling it to be subjected subsequently to densification without requiring support tooling.

Consolidation can be performed by a liquid technique, impregnating the preform with a composition containing a resin which is subsequently polymerized. It is possible to use a resin that is of a provisional nature, suitable subsequently for being eliminated at high temperature when densifying the preform. It is also possible to use a resin that constitutes a precursor of a material compatible with or identical to that constituting the matrix of the composite material that is to be made.

To make the fiber reinforcement or a composite material part, it is also well known to use a preform that has been needled. This is achieved by needling two-dimensional plies. The plies may be stacked flat or rolled in superposed turns so as to form a sleeve, for example, or they may be shaped, e.g. by being draped over a former. The plies are constituted, for example, by layers of cloth, sheets of unidirectional or multidirectional yarns or tows, layers of felt, ribbons, braids, . . .

A plurality of plies may be superposed prior to needling, or needling may be performed each time a ply is added, as described in document U.S. Pat. No. 4,790,052.

In some cases, it is advantageous to introduce solid fillers in powder form within the fiber preform. The powder may be of a material that is identical to or compatible with the material used for the matrix, and it serves in particular to reduce the porosity of the preform, and consequently to reduce the quantity of the matrix that needs to be formed using the liquid or the gas technique. The powder may also comprise one or more materials that confer particular properties on the composite material, for example better resistance to oxidation, specific tribological properties, radar furtiveness, etc.

Introducing powder within a fiber preform raises difficulties, in particular when the powder must be introduced in controlled manner, for example uniformly or with a predetermined gradient of powder presence across the preform.

A known technique consists in adding the powder to a liquid composition containing a resin for consolidating or densifying the preform.

That technique is suitable for impregnating individual two-dimensional plies, but it is not suitable for impregnating thick three-dimensional structures.

When the preform is impregnated by a liquid composition charged with powder by immersing the preform in a bath of liquid composition or by spraying the composition onto the outside faces of the preform, it is necessary for the viscosity of the composition to be lowered as much as possible in order to encourage preform wetting and thus penetration of the liquid composition to the core of the preform. This requires a large quantity of solvent to be used which must then be eliminated, with the associated problems on environmental, hygiene, and safety grounds. Furthermore, the distribution of powder within the preform is very difficult or impossible to control.

Another technique for introducing powder consists in applying vacuum suction with a powder in suspension in a liquid vehicle, the suspension being brought to one side of the preform and a filter being placed on the opposite side to retain the powder. One such method is described in document U.S. Pat. No. 5,352,484 for the purpose of introducing carbon powder. That method requires the use of special tooling, and like the preceding method, it requires the powder to be of very small grain size and thus of relatively high cost. In addition, although that method is good for achieving a high degree of pore-filling with the powder, it does not enable the distribution of powder within the volume of the preform to be controlled. It is therefore of limited use.

Document FR 2 619 104 proposes making a part out of C/C composite material by a method comprising:

impregnating fiber plies with a liquid composition containing a resin and solid fillers in powder form;

superposing and needling together the plies as impregnated in this way; and implementing heat treatment to polymerize and carbonize the resin.

In document FR 2 619 104, the method applies to conventional technology for obtaining composite materials from preimpregnated pieces with added needling.

Needling fiber plies that have been preimpregnated with a liquid resin inevitably leads to rapid clogging of the needles and even of the needling machine that carries them. This clogging quickly reduces the effectiveness of the needles. It is therefore necessary to proceed with frequent operations of cleaning the needles and the machine, which is particularly penalizing in terms of the cost and duration of the process.

OBJECT AND SUMMARY OF THE INVENTION

An object of the invention is to provide a method enabling powder fillers to be introduced in controlled manner within a fiber preform without presenting the drawbacks of the prior art methods mentioned above.

This object is achieved by a method of making a composite material part comprising fiber reinforcement densified by a matrix, the method comprising making a fiber preform constituting the fiber reinforcement by superposing and by bonding together fiber plies by needling, and by densifying the needled preform by introducing a matrix-constituting material into it, wherein, before the end of the process of needling of the fibers plies, a powder is dusted onto the surface of at least some of the plies, the powder comprising at least one resin in powder form that is not completely cross-linked, and cross-linking of the resin is terminated after superposing and needling the last ply so as to obtain a consolidated preform.

Preferably, powder is dusted onto the surface of the top ply of the preform that is being made prior to superposing and needling at least one additional ply. The needling may be performed each time a new ply is added, or after a plurality of plies have been added.

It is advantageous for the total quantity in volume terms of the resin in powder form dusted while making the preform to be less than 30% of the total apparent volume of the fiber plies. The resin thus contributes merely to consolidating the preform, with the densification of the preform to form the matrix being performed subsequently.

The presence of a limited quantity of resin in solid powder form is entirely compatible with needling.

In addition, the grains of resin powder that are introduced have the effect of blocking possible return of bundles of fibers transferred by the needles transversely to the plies (Z direction), thereby improving the effectiveness of the needling in terms of the quantity of fibers transferred in the Z direction.

In addition, using a solid resin in powder form instead of a liquid resin avoids the need to use solvents, with the hygiene and safety problems associated therewith, and makes it possible to reduce the duration of the resin polymerization cycle.

The powder may also comprise refractory solid fillers, for example carbon, graphite, or ceramic powder. The total quantity by volume of such solid fillers dispersed while making the preform is preferably less than 10% of the total apparent volume of the needled fiber plies.

The method of the invention makes it possible in simple manner to solve the problem of introducing powder into a needled preform with the ability to control the distribution of powder within the preform. Thus, the powder can be distributed uniformly or the quantity and/or the composition of the powder dispersed on the surface of the plies can be varied depending on the properties desired for the composite material. It should also be observed that there is no need to have recourse to a powder having very small grain size in order to guarantee that it is present within the core of the reform.

Compared with the above-mentioned known methods seeking to impregnate needled fabrics with a consolidation resin or with fillers, the method of the invention also has the major advantage that introducing the resin or the fillers and needling are both performed in a single operation.

BRIEF DESCRIPTION OF THE DRAWINGS

The invention will be better understood on reading the following description given by way of non-limiting indication. Reference is made to the accompanying drawings, in which:

FIGS. 4 and 6 are photographs showing details of FIGS. 3 and 5 respectively.

DETAILED DESCRIPTION OF AN IMPLEMENTATION OF THE INVENTION

The invention seeks in general terms to fabricate composite material parts by making needled preforms in which a powder of resin and/or solid fillers is incorporated, and then densifying the preforms.

The preform is made by superposing and needling together fiber plies that are essentially two-dimensional.

The plies may be formed by layers of cloth, uni- or multi-directional sheets, braids, ribbons, layers of felt, etc.

The plies may be formed of individual layers stacked flat, or of superposed turns of a straight strip or ribbon wound around an axis, or of flat superposed turns formed by helically winding a cloth or a strip, for example a helical cloth. Reference can be made to documents U.S. Pat. No. 4,790,052 and U.S. Pat. No. 6,009,605 which describe such methods of making needled preforms.

For convenience, the description below relates to making preform by stacking and needling individual plies which are superposed while flat, it being understood that the method of the invention is applicable to the various ways of making needled preforms as mentioned above, and as will be immediately apparent to the person skilled in the art.

Figure 1A:
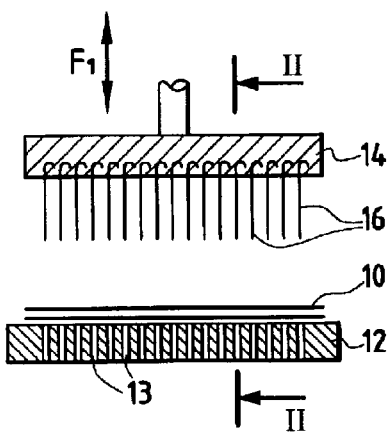
FIGS. 1A to 1E show steps in making a composite material part by a method in accordance with the invention.

The plies 10 for needling are stacked on a horizontal tray 12 (FIG. 1A). Needling is performed by means of a needle board 14 carrying barbed or forked needles 16. The needle board is driven in reciprocating motion transversely relative to the plies, e.g. vertically (arrow $F_1$).

Needling is performed over the entire area of the plies. By way of example, the needle board extends over the full width of the plies and relative horizontal movement can be imparted between the plies and the needle board in order to scan the entire surface area of the plies (arrow $F_2$).

Figure 2:
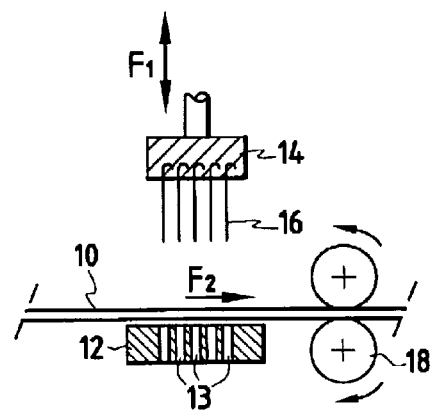
FIG. 2 is a section view on plane II—II of FIG. 1A.

In the example shown, the scanning movement is implemented by moving the plies on the tray 12, e.g. by means of a pair of drive rollers 18 (FIG. 2).

In order to enable the needles 16 to pass through the bottom ply without being damaged, at least at the beginning of the process of stacking and needling the plies, the tray 12 is provided with holes 13 in register with the locations of the needles.

In a variant, relative horizontal movement between the plies and the needle board can be obtained by moving the needle board. Under such circumstances, a protective layer such as a base felt is interposed between the tray and the bottom ply of the stack, as described in above-mentioned document U.S. Pat. No. 4,790,052, so that the needles can penetrate into said protective layer without being damaged.

In accordance with the invention, while the preform is being made, before the end of the process of needling of the fiber plies, powder is introduced into the preform by dusting the top surface of the top ply in the stack made on the tray.

The powder can be dusted onto each newly added ply, or after a group of plies has been added.

Advantageously, the powder comprises a solid resin for consolidating the needled preform. Under such circumstances, the resin in powder form is preferably dusted onto each ply so as to introduce the resin uniformly throughout the preform.

The resin in powder form is preferably selected to be in a state of polymerization that is incomplete but fairly advanced, so as to facilitate a subsequent step of completing polymerization while nevertheless limiting the risk of clogging the needles.

The resin in powder form may be selected from precursors of a material similar to or compatible with the material of the matrix of the composite material that is to be made. Solid resins that are precursors of carbon comprise, for example, phenolic resins or pitch, whereas solid resins that are precursors of ceramic comprise, for example, organosilicon compounds such as polycarbosilane, a precursor for SiC. It would also be possible to select a solid resin which, after polymerization, can be eliminated by heat at the beginning of the process of densifying the matrix, and without leaving any solid residue. Such a resin is comprised, for example, by a vinyl alcohol or a polymethyl methacrylate.

The density and the frequency of needling are likely to cause the preform to become heated during needling, so care should be taken to use a resin which is not likely to suffer complete polymerization as a result of such heating.

As a result, the resin in powder form is preferably selected from pitch and phenolic resins of the "Novolac" type.

Adding resin in powder form serves solely to consolidate the preform, not to densify it. Consequently, the total quantity of resin powder added is restricted, and preferably less than 30% by volume relative to the total apparent volume of the needled fiber plies.

The added solid resin contributes to blocking bundles of fibers that are transferred in the Z direction by the needles, and thus to preventing fibers returning after they have been moved by the needles. This increases the effectiveness of needling.

Advantageously, the powder also comprises one or more fillers constituted, for example, from powders selected from carbon, graphite, or ceramic for the purpose of partially filling the pores of the fiber preform prior to final densification, or for conferring particular properties on the composite material of the resulting part. Thus, for example, adding powders of boron compounds such as $B_4C$, $SiB_6$, $TiB_2$, can contribute to improving resistance to oxidation, whereas adding powders of silicon compounds such as SiC or $Si_3N_4$ can confer particular tribological properties such as better resistance to wear by friction.

The nature and/or quantity of the solid fillers added may vary across the thickness of the preform that is made, depending on what properties are desired.

Nevertheless, it is desirable to restrict the quantity of solid fillers that are added so as to avoid impeding needling or giving rise to major and fast wear of the needles. For these reasons, the total quantity of added solid fillers is preferably less than 10% by volume relative to the total apparent volume of the needled fiber plies.

Figure 1B:
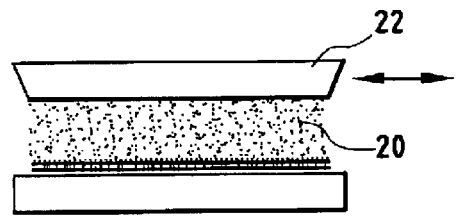

The powder 20 can be dusted onto the surface of a ply, for example by being spread from a vibrating screen 22 (FIG. 1B) so as to achieve uniform dusting.

Figure 1D:
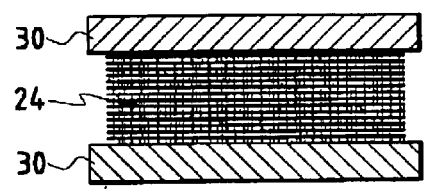
Figure 1C:
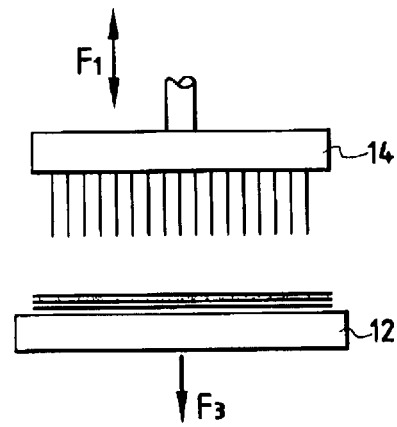

After the powder has been spread, at least one additional ply is added and is needled to the stack of underlying plies (FIG. 1C).

The tray 12 may be caused to move down one step (arrow $F_3$) after each needling pass. The stepsize may be constant or it may vary in accordance with some predetermined relationship, as described in document U.S. Pat. No. 5,792,715. Variation in the downward stepsize makes it possible to control the depth of needle penetration and thus to control the quantity of fibers that are transferred in the Z direction through the thickness of the preform.

The operations of spreading the powder, adding a needling layer, and lowering the tray are continued until a preform of the desired thickness has been obtained.

When the powder dusted into the resulting preform 24 comprises a resin, the polymerization of the resin is completed after the last ply has been put into place and needled, in order to consolidate the needled preform. During this consolidation stage, the preform may be held in shape in tooling 30 (FIG. 1D).

The resin may be transformed into carbon by heat treatment at a temperature above 750° C., for example at a temperature lying in the range 750° C. to 1200° C., under a vacuum or in an inert atmosphere. In a variant, this carbonization may be performed during the temperature rise stage that is implemented at the beginning of the subsequent process of densification. When the densification process is performed by a liquid technique, impregnation by a liquid precursor of the material constituting the matrix can be implemented prior to carbonization, so that the transformations of the resin into carbon and of the precursor into matrix take place during the same heat treatment.

Densification of the preform by the material constituting the matrix of the composite material that is to be made, e.g. carbon or ceramic, can be performed by chemical vapor infiltration. The consolidated preform is placed on a loading tray 34 in an infiltration oven 32 (FIG. 1E).

Figure 1E:
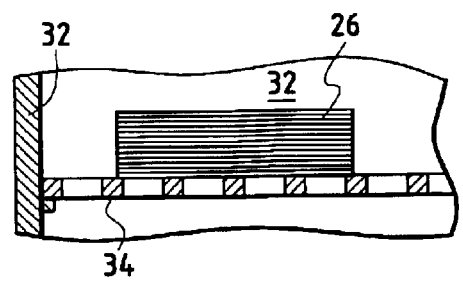
Figure 3:
FIGS. 3 and 5 are photographs showing needled preforms obtained by a method of the invention.
Figure 5:
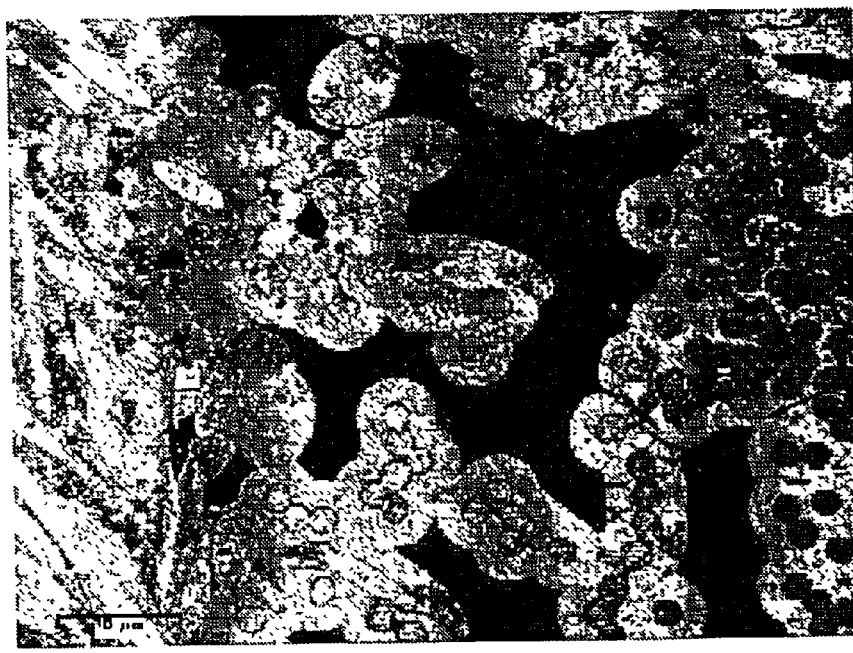

When the preform is made with resin in powder form incorporated therein in order to consolidate it, densification of the consolidated preform 26 can be implemented without any need for support tooling, as shown in FIG. 1E.

In a variant, densification can be performed by a liquid technique.

Examples of composite material parts that have been made by a method in accordance with the invention are described below.

Preforms were made by superposing and needling fiber plies made up of multidirectional sheets, each sheet being obtained by superposing a plurality of unidirectional sheets of carbon fibers, with the sheets being superposed in different directions.

A needling pass was performed after each ply had been put into place, and it was performed over the entire surface area thereof. The stack of plies can be lowered prior to each new needling pass. Such lowering can be performed in steps that are regular or otherwise depending on the desired distribution of Z direction fiber density through the thickness of the preform.

On each newly-placed ply, and prior to needling it, powder was dusted uniformly, said powder comprising phenolic resin powder and/or fillers (carbon black or graphite powder).

When phenolic resin was introduced, it was transformed into carbon by heat treatment at about 800° C., after cross-linking.

The table below gives the characteristics of the preforms that were obtained, each preform comprising ten needled superposed plies. In the table:

fiber density is the percentage of the apparent volume of the preform that is occupied by the fibers;

the quantity of the powder introduced is a mass percentage and represents the fraction of the total mass of the preform that is constituted by the powder (prior to carbonizing the resin, if any);

the ratio of introduced powder is a volume percentage representing the fraction of the total apparent volume of the preform that is constituted by the powder (prior to carbonizing the resin, if any); and carbon ratio is a volume percentage constituting the fraction of the total apparent volume of the preform that is occupied by carbon (after carbonizing the resin, if any).

| Preform | Fiber density (volume %) | Nature of powder introduced | Quantity of powder introduced (mass %) | Powder density (volume %) | Carbon ratio (volume %) |
|---|---|---|---|---|---|
| A | 27.7 | Phenolic resin | 25 | 7.5 | 30.1 |
| B | 25.5 | Graphite powder | 18 | 3.0 | 28.5 |
| C | 24.6 | Carbon black | 24 | 6.5 | 31.1 |
| D | 25.6 | Phenolic resin and graphite powder | 25 | 8.2 | 29.5 |

FIGS. 3 to 6 are photographs of materials obtained after carbonizing the phenolic resin and final densification of preforms A and D by pyrolytic carbon obtained by chemical vapor infiltration.

It can be seen that the presence of powder has not affected the transfer of fibers in the Z direction by the needling, and that the residue (or coke) of carbonizing the phenolic resin, optionally filled with graphite powder, contributes greatly to densifying the material in a manner that is distributed within the material.

What is claimed is:

1. A method of making a composite material part comprising fiber reinforcement densified by a matrix, the method including:

making a fiber preform constituting the fiber reinforcement by superposing fiber plies in a stack and progressively bonding the superposed fiber plies by needling;

during the making of the fiber preform and before completion of the process of needling of all the fiber plies constituting the fiber preform, dusting a powder on at least some of the plies, the powder comprising at least one resin in powder form that is partially cross-linked, obtaining a consolidated preform by terminating linking of said resin after superposing and needling of a last superposed fiber ply; and, subsequently, densifying the needled and consolidated preform by introducing a matrix material into it.

2. A method according to claim 1, wherein the powder is dusted onto the surface of the top ply of the preform that is being made prior to superposing and needling at least one additional ply.

3. A method according to claim 1, wherein each new superposed ply is needled onto the underlying stack of plies.

4. A method according to claim 1, wherein the total quantity in volume terms of the resin in powder form dusted while making the preform is less than 30% of the total apparent volume of the fiber plies.

5. A method according to claim 1, wherein the powder comprises at least one resin in powder form selected from resins that are precursors of carbon and resins that are precursors of ceramic.

6. A method according to claim 1, wherein the powder comprises refractory solid fillers.

7. A method according to claim 6, wherein the refractory solid fillers are selected from carbon or graphite powders and ceramic powders.

8. A method according to claim 1, wherein the total quantity in volume terms of the refractory solid fillers in powder form dusted while making the preform is less than 10% of the total apparent volume of the fiber plies.

9. A method according to claim 1, wherein the quantity and/or the composition of the powder dusted onto the surface of the plies is caused to vary while the preform is being made.

10. A method according to claim 1, wherein the needled preform is densified by chemical vapor infiltration.

11. A method according to claim 1, wherein the needled preform is densified by a liquid technique.

* * * * *

UNITED STATES PATENT AND TRADEMARK OFFICE
CERTIFICATE OF CORRECTION

| | |
|---|---|
| PATENT NO. | : 7,052,632 B2 |
| APPLICATION NO. | : 10/316125 |
| DATED | : May 30, 2006 |
| INVENTOR(S) | : Eric Lavasserie et al. |

It is certified that error appears in the above-identified patent and that said Letters Patent is hereby corrected as shown below:

Column 3, line 56, "reform" should read --preform--; and

Column 4, line 29, "preform" should read --a preform--.

Signed and Sealed this

Sixth Day of March, 2007

JON W. DUDAS
*Director of the United States Patent and Trademark Office*